(12) United States Patent
D'Orazio et al.

(10) Patent No.: US 8,600,190 B1
(45) Date of Patent: Dec. 3, 2013

(54) METHOD FOR COMBINING TWO IMAGE DATA SETS USING FIXED DISTRIBUTION

(75) Inventors: Angela Marie D'Orazio, Rochester, NY (US); Kenneth Michael Brodeur, Webster, NY (US)

(73) Assignee: Exelis, Inc., McLean, VA (US)

( * ) Notice: Subject to any disclaimer, the term of this patent is extended or adjusted under 35 U.S.C. 154(b) by 712 days.

(21) Appl. No.: 12/846,086

(22) Filed: Jul. 29, 2010

(51) Int. Cl.
*G06K 9/36* (2006.01)

(52) U.S. Cl.
USPC ............................. 382/284; 382/132; 382/167

(58) Field of Classification Search
USPC .......................................... 382/132, 167, 284
See application file for complete search history.

(56) References Cited

U.S. PATENT DOCUMENTS

| | | | |
|---|---|---|---|
| 5,187,747 A * | 2/1993 | Capello et al. | 382/124 |
| 5,818,528 A * | 10/1998 | Roth et al. | 348/364 |
| 6,259,472 B1 * | 7/2001 | Park | 348/28 |
| 6,343,159 B1 * | 1/2002 | Cuciurean-Zapan et al. | 382/284 |
| 6,735,330 B1 * | 5/2004 | Van Metter et al. | 382/132 |
| 6,785,425 B1 * | 8/2004 | Feder et al. | 382/247 |
| 7,359,573 B2 * | 4/2008 | Park et al. | 382/274 |
| 7,388,998 B2 * | 6/2008 | Han et al. | 382/274 |
| 7,512,268 B2 * | 3/2009 | Kempf et al. | 382/167 |
| 7,925,113 B2 * | 4/2011 | Lim | 382/284 |
| 2006/0251200 A1 * | 11/2006 | Miller | 375/371 |
| 2007/0076948 A1 * | 4/2007 | Haas et al. | 382/168 |
| 2007/0136012 A1 * | 6/2007 | Miller | 702/67 |

OTHER PUBLICATIONS

Gonzalez, Rafael C. et al., "Digital Image Processing," Prentice Hall, New Jersey, pp. 598-600, 2002.

* cited by examiner

*Primary Examiner* — Vu Le
*Assistant Examiner* — Aklilu Woldemariam
(74) *Attorney, Agent, or Firm* — Ratnerprestia

(57) ABSTRACT

A method of forming an output image based on first and second input images includes the steps of: (a) selecting a desired mix-ratio between the first and second input images; (b) determining an angle φ based on the selected mix-ratio; and (c) extending a diagonal line, at the angle of φ between a vertical axis and a horizontal axis, in which the vertical axis includes a first set of gray levels from the first input image and the horizontal axis includes a second set of gray levels from the second input image. The method further includes the steps of: (d) computing an area A included within the horizontal and vertical axes and the diagonal line, in order to determine a gray level value of a pixel of the output image based on a probability value of $k=A/n^2$, where, n is a maximum gray level value of each of the input images, and k varies from 0 to 1. In one embodiment, the fixed probability distribution is uniform, and the input and output image bit depths are equal to each other. Then the gray level value of z of the output image becomes A/n.

16 Claims, 15 Drawing Sheets

MIX-RATIO = 0

IMAGE B

|  | | 0 | 1 | 2 | 3 |
|---|---|---|---|---|---|
| IMAGE A | 0 | 0 | 0 | 0 | 0 |
| | 1 | 1 | 1 | 1 | 1 |
| | 2 | 2 | 2 | 2 | 2 |
| | 3 | 3 | 3 | 3 | 3 |

FIG. 4A

MIX-RATIO = 1

IMAGE B

|  | | 0 | 1 | 2 | 3 |
|---|---|---|---|---|---|
| IMAGE A | 0 | 0 | 1 | 2 | 3 |
| | 1 | 0 | 1 | 2 | 3 |
| | 2 | 0 | 1 | 2 | 3 |
| | 3 | 0 | 1 | 2 | 3 |

FIG. 4B

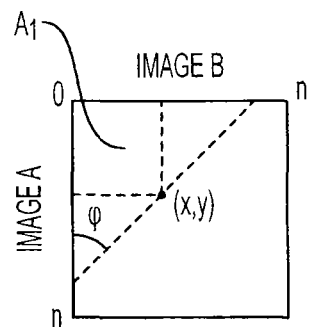 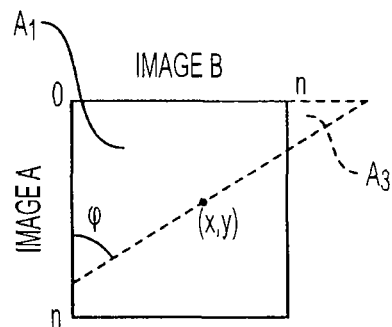
FIG. 10AFIG. 10B
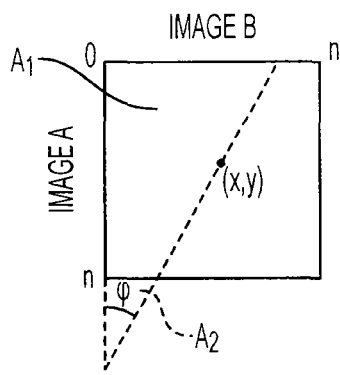 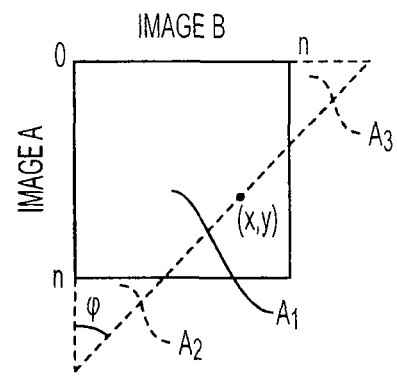
FIG. 10CFIG. 10D

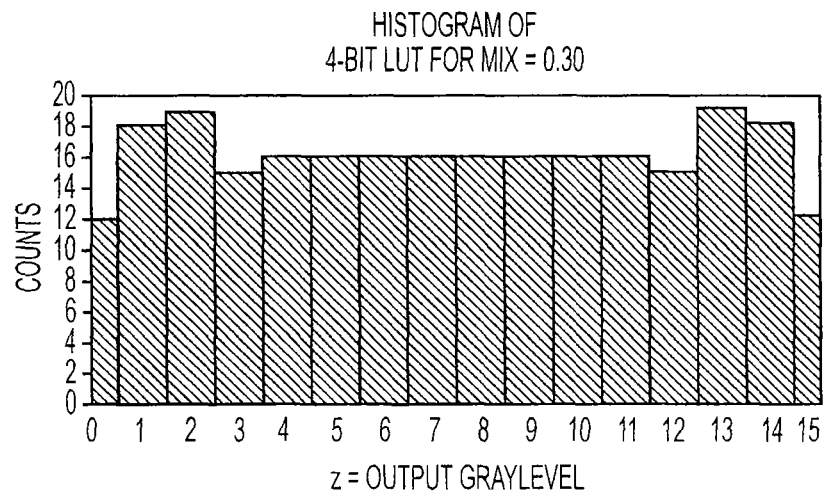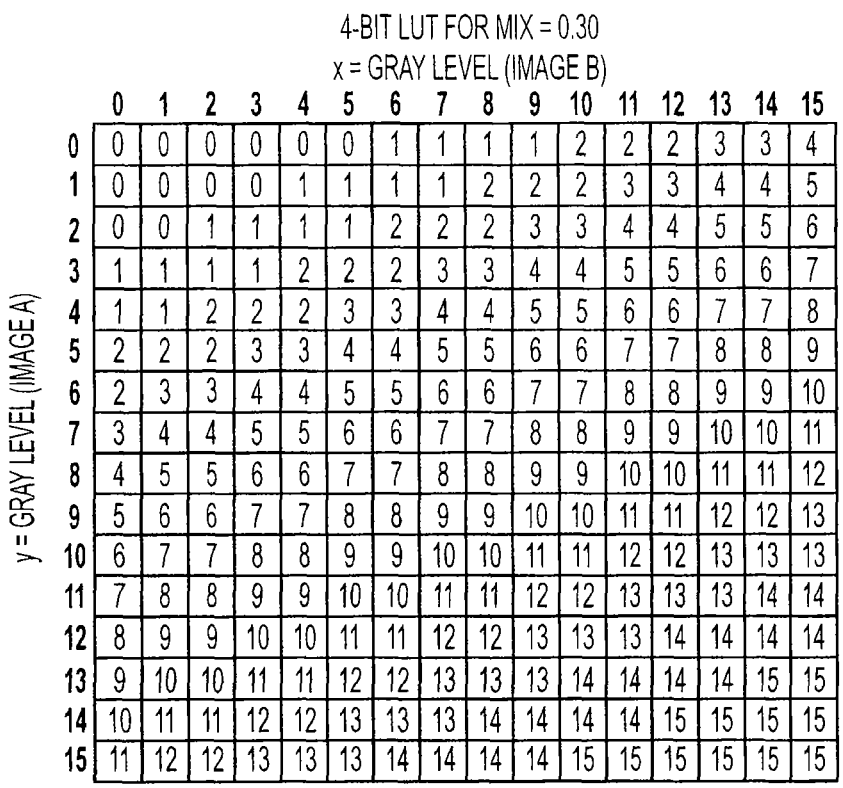
FIG. 14

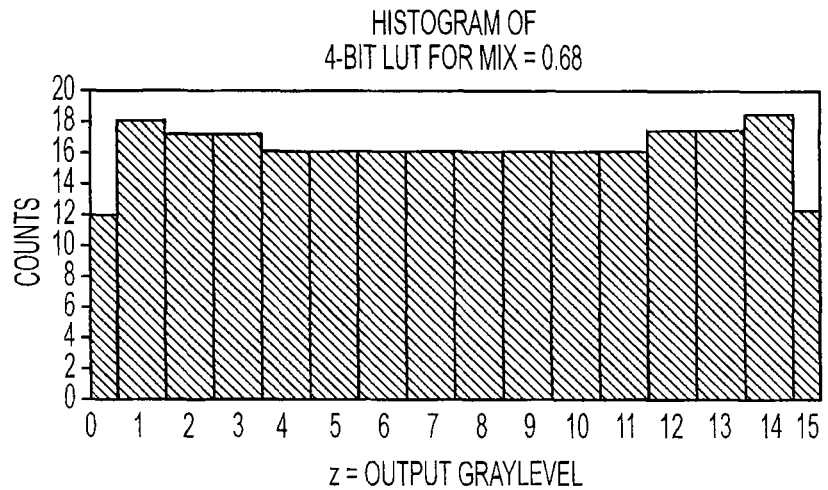
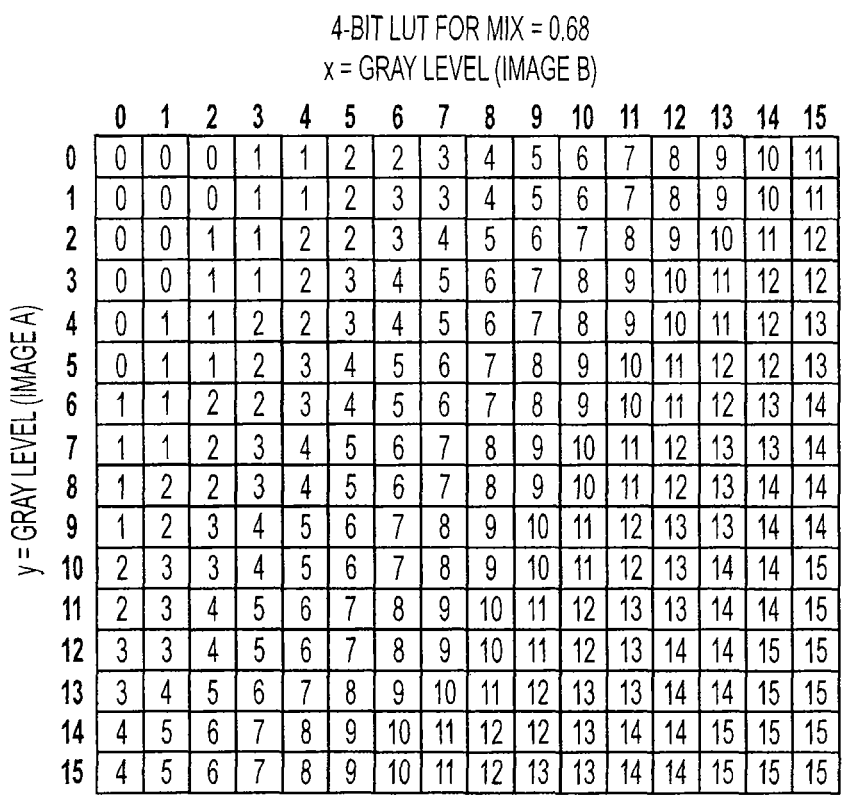
FIG. 15 z IS ALWAYS A GRAY LEVEL THAT VARIES FROM 0 TO THE MAX GRAYLEVEL, s
k IS ALWAYS A PROBABILITY THAT VARIES FROM 0 TO 1.

z IS ALWAYS A GRAY LEVEL THAT VARIES FROM 0 TO THE MAX GRAYLEVEL, s
k IS ALWAYS A PROBABILITY THAT VARIES FROM 0 TO 1.

z IS ALWAYS A GRAY LEVEL THAT VARIES FROM 0 TO THE MAX GRAYLEVEL, s
k IS ALWAYS A PROBABILITY THAT VARIES FROM 0 TO 1.

METHOD FOR COMBINING TWO IMAGE DATA SETS USING FIXED DISTRIBUTION

TECHNICAL FIELD

The present invention, in general, relates to methods and systems for combining two digital input images to produce a fused output image. More specifically, the present invention relates to controlling the distribution of the output image by attempting to drive the output gray level values so that they do not naturally move towards the middle gray region. The resulting fused image of the present invention has more contrast than an image resulting from a ratio-metric approach.

BACKGROUND OF THE INVENTION

When combining or fusing two digital images, conventional methods combine a weighted image-A with a weighted image-B. This is generally the least computationally complex approach to fusing image data. The resultant image may subsequently be processed by various image enhancement steps, such as dynamic range adjustment (contrast enhancement) and tonal transfer curve (gamma) adjustment to provide a visually appealing image. Prior to combining the imagery, both images may be contrast enhanced to maximize detail and edge content. Tonal corrections may also be performed.

It is typically assumed that if the two incoming images (A and B) are optimally enhanced prior to mixing, then the resulting image also includes high information content. In practice, however, this is not realized, because the weighted images tend to produce 'clumped' output data sets. When fusing each possible combination of input gray level pairs, the output distribution of the fused dataset typically includes more data in the central range than at the outer edges. The 'clumped' output may be seen in FIGS. 1A, 1B and 1C, in which histograms of output gray levels resulting from combining each possible input pair of gray levels from image A and image B are shown. FIG. 1A results from combining all possible input gray level pairs, using a mix-level of 0.25; FIG. 1B results from combining all possible input gray level pairs using a mix-level of 0.5; and FIG. 1C results from combining all possible input gray level pairs using a mix-level of 0.75.

The resulting output using the ratio-metric approach shown in these figures achieves images with characteristic middle-gray weighted data, usually low contrast data, which are not visually appealing. Furthermore, determining an appropriate gamma, or TTC curve, and a contrast stretch method to enhance these image data sets—regardless of input content—is not straight forward.

The present invention, on the other hand, targets an output distribution of a combined image, in which the look and tone of the fused brightness of the image are controlled. As will be explained, the present invention provides a fixed distribution look-up-table (LUT) for combining two digital images to produce a fused image that maintains expected contrast and does not reduce it. The present invention also provides an algebraic approach to obtaining a fixed distribution, when fusing two images, and achieves the fusion without need of a LUT that requires large memory storage and large processing power.

SUMMARY OF THE INVENTION

To meet this and other needs, and in view of its purposes, the present invention provides a look-up-table (LUT) for forming an output image from a combination of two input images. The LUT includes first and second sets of gray levels, respectively, formed from first and second input images; and a third set of gray levels, calculated by a processor, for forming an output image. The third set of gray levels is formed from the first and second sets of gray levels. A pixel of the output image includes a gray level value of z that is dependent on a probability distribution function of gray levels in the LUT, expressed as p(z), where z is a gray level. In addition, P(z) is a cumulative distribution function (CDF) of p(z), and the gray level value, z, of the pixel is a function of the inverse of P(z); the inverse is denoted as $P^{-1}(k)$.

The LUT may include a virtual two dimensional table having horizontal and vertical axes, x and y, in which r is a maximum gray level value of the first set of gray levels, virtually placed along the vertical axis; q is a maximum gray level value of the second set of gray levels, virtually placed along the horizontal axis; and s is a maximum gray level of the output set of gray levels. In an exemplary embodiment, the two input images have the same bit depth. In other words, q is equal to r. If a single variable, n, equals the maximum value of both sets of input gray levels, then n=q=r. Furthermore, A is an area in the LUT included within the horizontal and vertical axes and a diagonal line extending between the horizontal and vertical axes, through a point (x, y). Then the gray level value, z, of the pixel is located on the diagonal line and is $P^{-1}(k=A/(n^2))$, where k varies between 0 and 1.

The p(z) may include a uniform probability distribution of 1/s, where s is a maximum gray level value of the pixels in the output. Then the gray level value, z, of the output pixel, is $z=(As)/(n^2)$. The values of n and s are maximum pixel values, respectively, of the input sets of gray levels and an output set of gray level values.

The diagonal line is extended between the vertical axis and the horizontal axis at an angle of φ with respect to the vertical axis, through the point (x, y) in the virtual LUT, where y is the pixel value from the first image, and x is the pixel value from the second image. A gradient from dark gray levels to light gray levels is formed along the angle φ with respect to the vertical axis, and the angle φ is determined by a mix-ratio of α, as follows:

$$\varphi = \frac{\pi}{2(1-\alpha)}.$$

The mix-ratio may be determined either automatically by the processor or manually by a user.

Another embodiment of the present invention is a system for fusing input images to form an output image. The system includes a first imager for forming a first image, a second imager for forming a second image, and a processing module for fusing the first and second images. The processing module includes a calculator for determining a gray level value of z assigned to a pixel of the output image, based on a probability distribution function expressed as p(z), where z is a gray level. The P(z) is a cumulative distribution function (CDF) of p(z), and the gray level value, z, of the pixel is a function of the inverse of P(z), where the inverse is denoted $P^{-1}(k)$.

The p(z) may include a uniform probability distribution of 1/s, where s is a maximum gray level value of the output pixels. Then the gray level value, z, of the output image pixel is $z=(As)/(n^2)$.

Yet another embodiment of the present invention is a method of forming an output image based on first and second input images. The method includes the steps of:
    determining a mix-ratio, α, between the first and second input images;

determining an angle φ based on the mix-ratio of α, as follows:

$$\varphi = \frac{\pi}{2(1-\alpha)}$$

extending a diagonal line at the angle of φ between a vertical axis and a horizontal axis in the LUT, in which the vertical axis, x, includes a gray level value from the first input image, and the horizontal axis, y, includes a gray level value from the second input image and the diagonal line passes through a position (x, y) at the angle φ with respect to the vertical axis;

computing an area A included within the horizontal and vertical axes and the diagonal line, determining the gray level value, defined as z, at position (x, y) for the pixel of the output image using the following equation:

$$z = P^{-1}(k = A/(n^2))$$

where, n represents the maximum gray level of both the first input image and the second input image. The value k varies between 0 and 1.

In the method, p(z) includes a uniform probability distribution of 1/s, where s is a maximum gray level value of the output pixels, and the gray level value, z, of the pixel of the output image is $z=(As)/(n^2)$. The values of n and s are maximum gray level values, respectively, of the input sets of gray levels, and an output set of gray levels.

Furthermore, in the method, P(z) is a cumulative distribution function (CDF) of p(z), and the gray level value, z, of the pixel of the output image is a function of the inverse of P(z), where the inverse is denoted as $P^{-1}(k)$.

The method also includes the step of:
forming a gradient from dark gray levels to light gray levels along the angle φ with respect to the vertical axis.

It is understood that the forgoing general description and the following detailed description are exemplary, but are not restrictive, of the invention.

BRIEF DESCRIPTION OF THE FIGURES

The invention may be understood from the following detailed description when read in connection with the accompanying figures:

FIG. 4A is an exemplary LUT populated with gray levels ranging from 0 to 3 providing 2-bit fused imagery for an input mix-ratio of 0, thereby reproducing the 2-bit gray levels of input image A, in accordance with an embodiment of the present invention.

FIG. 4B is an exemplary LUT populated with gray levels ranging from 0 to 3 providing 2-bit fused imagery for an input mix-ratio of 1, thereby reproducing the 2-bit gray levels of image B, in accordance with an embodiment of the present invention.

FIGS. 10A, 10B, 10C and 10D depict four different scenarios for calculating the fractional area covered by the area of interest, A, shown in FIG. 9A, in accordance with an embodiment of the present invention.

FIG. 14 is an example of a virtual LUT formed by using the algebraic method shown in FIG. 13 and a uniform probability distribution, based on 4-bit input imagery (gray levels ranging from 0 to 15) and a mix-ratio of 0.30. Also shown is the associated histogram of output gray levels, which is approximately uniform.

FIG. 15 is another example of a virtual LUT formed by using the algebraic method shown in FIG. 13 and a uniform probability distribution, based on 4-bit input imagery (gray levels ranging from 0 to 15) and a mix-ratio of 0.68. Also shown is the associated histogram of output gray levels, which is approximately uniform.

DETAILED DESCRIPTION OF THE INVENTION

The present invention provides a process for populating a fixed-distribution look-up-table (LUT) by receiving dual-modality images and then combining these images into a single (fused) image. The process uses image data, as well as a mapping function that includes a specified distribution of gray levels. The process or algorithm of the present invention provides increased control over how pixel values are mapped from the input images to the fused output image. Conventional approaches tend to cause the fused image to appear flat. Consequently, the fused image must be enhanced with dynamic range adjustment (DRA) algorithms. Such DRA algorithms that optimize the fused image vary with the mix-ratio and do not always work well for every image. The fixed-distribution LUT algorithm, on the other hand, achieves the desired result.

Assuming that input images A and B have been contrast enhanced prior to their combination, there likely exist bright and dark regions in both images (large expanse of dynamic range). Pixels of the input images that are bright, or dark, only remain bright, or dark, if they are combined with similar gray value pixels. These input images may come from images obtained from optics with overlapping or non-overlapping frequency band passes. In addition, the combination of weighting values per input image strongly influences how much contrast disparity is expected in the output image.

By assigning gray level outputs for every possible combination involved in mixing of two input images, the combined output image may be controlled so that its contrast is increased, without expense of downstream processing. Specifically, by using a particular look-up-table (LUT) and a target probability distribution, the present invention controls the spread of data in the output image. The present invention uses techniques, as will be explained, that are very different from conventional techniques, the latter including histogram equalization, which attempt to maximize contrast by forcing the output distribution to the full dynamic range of an output bin regardless of the input characteristics.

Figure 1A:
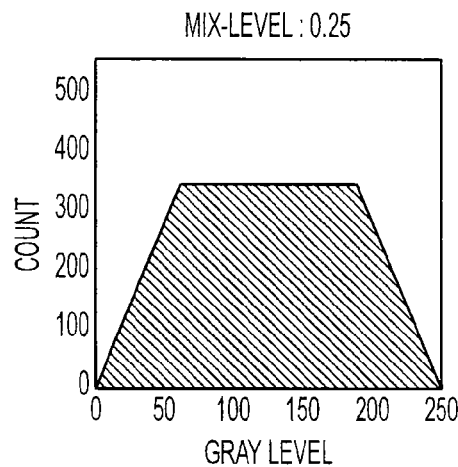
FIGS. 1A, 1B and 1C show the results of combining all possible input gray level pairs at different mix-levels using conventional methods, in which the resulting fused image tends to clump in the mid-range of gray level values with few, or no gray level values found in the end-ranges.
Figure 1B:
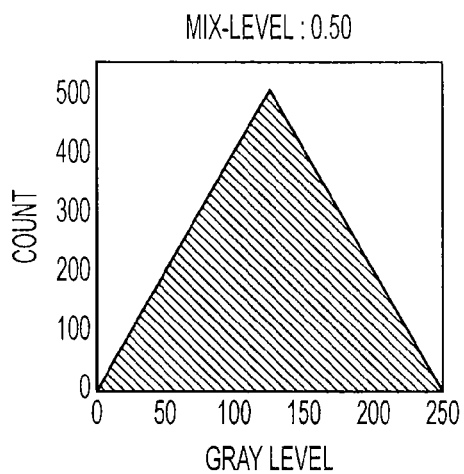
Figure 1C:
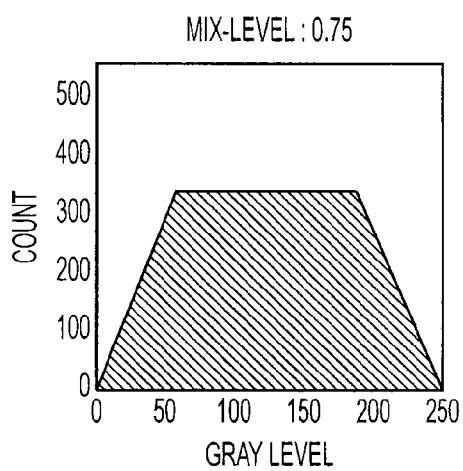
Figure 2:
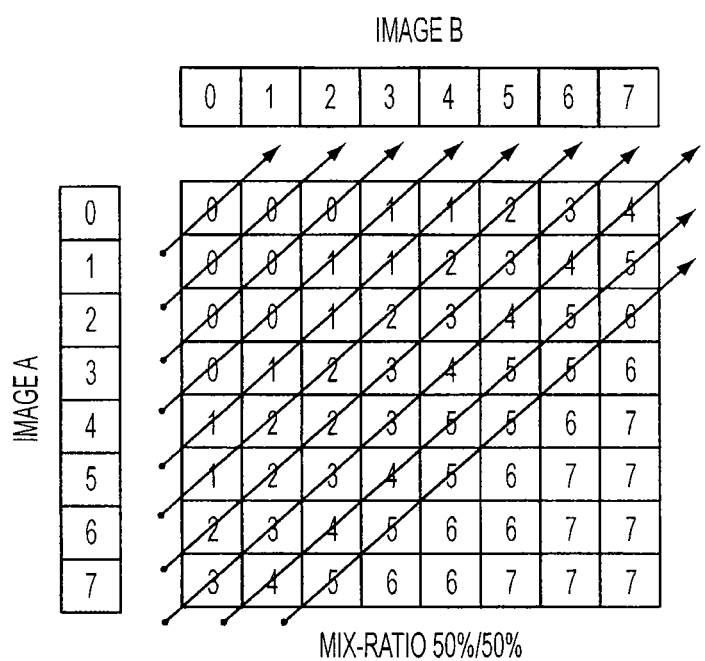
FIG. 2 shows an exemplary LUT populated with gray level values based on fusing two images at a mix-ratio of 50%/50%, in accordance with an embodiment of the present invention. The LUT is populated along the shown vectors by moving from left to right and top to bottom.
Figure 3:
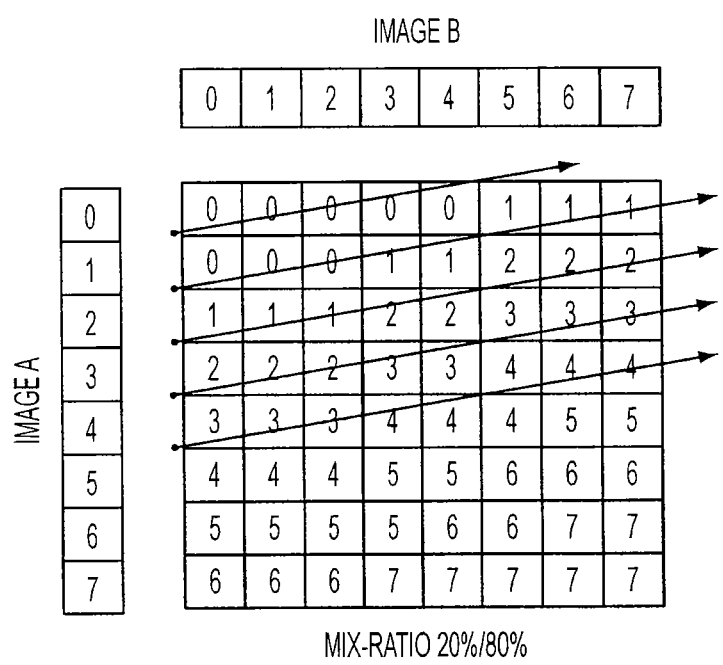
FIG. 3 shows an exemplary LUT populated with gray level values based on fusing two images at a mix-ratio of 20%/80%, in accordance with an embodiment of the present invention. The LUT is populated along the shown vectors by moving from left to right and top to bottom.

Referring first to FIGS. 2 and 3, a conceptual embodiment of the present invention is illustrated. Each figure shows an output table providing all combinations of gray level values based on two input images A and B. As shown, the gray level values of input image A are placed along the vertical axis of the table and the gray level values of input image B are placed along the horizontal axis of the table. Each table is populated with output gray level values that transverse the table based upon selected mix-ratio weights. By controlling which input gray level values are mapped to which output gray level values, a final targeted distribution is formed.

The generation of the output table may be thought of as resulting from use of slanting diagonal lines that are extended across the table. The angle of these lines is a variable and is a function of the desired output weights. By starting from top to bottom and moving from left to right, the table is populated with non-decreasing gray level values. FIG. 2 shows a table populated for a 50%/50% combination of images A and B. FIG. 3 shows a table populated for a 20%/80% combination of images A and B.

It will be appreciated that image A includes gray levels from 0 to 7 (bit-depth=3) and image B includes similar gray levels of 0 to 7 (bit-depth=3). The output is assumed to have the same bit depth, and the table is populated with various combinations of gray levels varying from 0 to 7, by moving along the slanting lines and populating the table with non-decreasing values starting at 0 and ending at 7. It will further be appreciated that the table shown in FIG. 2 (50%/50% mix) includes an equal distribution of gray level values varying from 0 to 7, in which each gray level value is repeated eight times. The table shown in FIG. 3, however, has the same equal distribution of gray level values, but is based on a different mix ratio (20%/80% mix).

These tables, however, may become extraordinarily large when using typical images having gray level values ranging from 0 to 255 (for example). Implementation of such large tables becomes unrealistic in processors and memories typically found in low-power devices. Advantageously, the present invention provides a method for populating a LUT that is cost effective in low-power devices. Instead of using a large two-dimensional LUT, the present invention provides direct computations that use an algebraic form to quickly determine output values for such a table.

As will be explained, by using triangles placed over a table and solving for various area shapes, the present invention determines, in an equivalent manner, how to populate the LUTs shown in FIGS. 2 and 3, without actually having to store large values of the LUT in a memory device. Thus, a virtual LUT is formed by way of calculations executed by a processor, or a computer.

Uses of the present invention, for example, may include image fusion, data-fusion, image processing and image enhancement. By way of example, a system may use two cameras operating at different bandpass frequencies to simultaneously collect two different modality images of a single target. Both images may be processed independently, aligned, and then fused into a single resultant image. The goal of fusing the two image modalities, of course, is to preserve important information from each image, after both are combined into a single fused image.

In the present invention, the fusion approach is adaptive. Specifically, the fusion algorithm includes a mix-ratio, so that the contents of the fused image may gradually transition from 100% of the content of image A to 100% of the content of image B. As referred to herein, fusion with a mix-ratio of 0 results in the gray levels of image A along the vertical axis of the LUT; and a mix-ratio of 1 results in the gray levels of image B along the horizontal axis of the LUT.

It will be understood that the present invention contemplates two modes for adjusting the mix-ratio, namely a manual mode and an automatic mode. In the manual mode, a user selects the mix-ratio. In the other mode, an algorithm uses metrics from the first image and metrics from the second image in order to select the mix-ratio automatically.

It will also be understood that both input images may be optimized before fusion of the output image occurs. If a user, for example, desires either 100% of image A (first image) or 100% of image B (second image), then no further processing of the input images would improve the quality of the output image. Therefore, under these circumstances, the fused output image would be identical to the desired corresponding input image.

It will further be appreciated that, as contemplated herein, the LUT need not be an actual table with values stored in memory, but rather the LUT may be a visual aide in representing an approach to the fusion problem solved by the present invention. The LUT is essentially a matrix that shows all possible output gray levels for pairs of input gray levels that are represented by the rows and columns of the matrix.

The gray levels of image A are represented by the rows of the LUT (along the vertical axis), and the gray levels of image B are represented by the columns of the LUT (along the horizontal axis). For ease of explanation purpose, it is assumed that the bit depth of the input images and the output image are all equal.

For example, if β is the bit depth, then n denotes the maximum number of gray levels in the LUT, as follows:

$$n = 2^\beta - 1.$$

For a particular pixel gray level value, x, of image B and a corresponding pixel gray level value, y, of image A, the resulting pixel in the fused image has a gray level value z corresponding to position (x, y) in the LUT. Using as an example a constraint that the input image must equal the output image, at mix-ratios of 0 and 1, FIGS. 4A and 4B provide examples of outputs in the image, at those mix-ratios for input and output imagery having a bit depth of 2. FIG. 4A shows the gray levels of the output image at mix-ratios of 0, and FIG. 4B shows the gray levels of the output image at mix-ratios of 1.

The fixed distribution LUT algorithm of the present invention, in one example, requires that the LUT have a histogram with a uniform distribution. This is a special case in the fixed distribution LUT fusion, referred to herein as a uniform fusion. Any desired histogram, however, may be used by the present algorithm. A uniform distribution is exemplified herein, because it works well in many cases, and because it minimizes the complexity of the algorithm.

In general, the algorithm requires that the gray levels in the LUT form a gradient from dark values to light values along an angle φ, this angle is determined by the mix-ratio, α, as follows:

$$\varphi = \frac{\pi}{2(1-\alpha)} \quad (1)$$

As previously described, the mix-ratio, α, is determined manually by the user, or automatically by the algorithm executed by the processor or computer.

The angle, φ, is determined using the following convention:

The angle, φ, is constrained by a mix ratio, such that $0 \le \varphi \le \pi/2$. When φ=0, the fused image is identical to the gray levels of input image B, and when φ=π/2, the fused image is equal to the gray levels of input image A.

Figure 5:
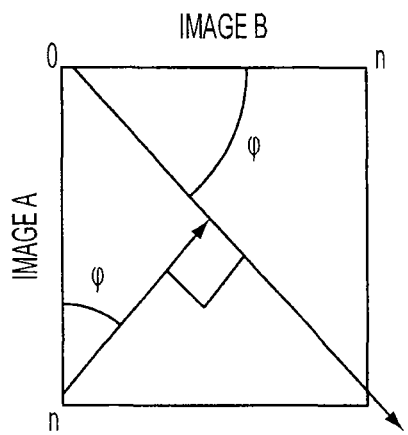
FIG. 5 is an illustration of angle φ formed between a diagonal line or a vector extended between (a) the vertical axis depicting gray level values of image A and (b) the horizontal axis depicting gray level values of image B, which is constrained by a mix-ratio such that 0≤φ≤π/2, in accordance with an embodiment of the present invention. When φ=0, then the fused image is identical to image B; and when φ=π/2, then the fused image is identical to image A.

The angle, φ, and its relationship to a LUT having input images of n-bits of resolution is shown in FIG. 5. In the example shown, the angle, φ, has a value of 45 degrees (π/4).

Figure 6:
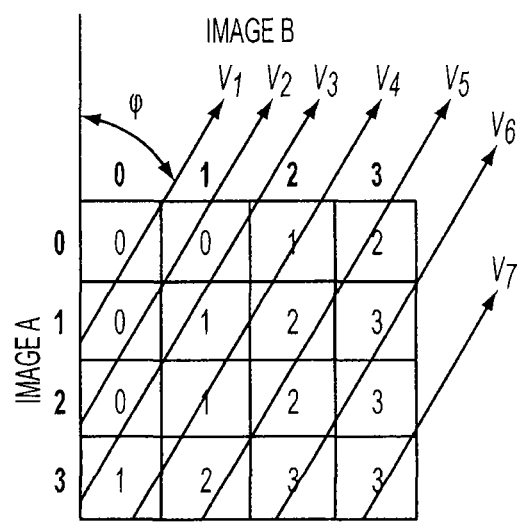
FIG. 6 is an exemplary LUT populated with gray levels ranging from 0 to 3 providing uniform fusion in the output image, based on 2-bit input images, in accordance with an embodiment of the present invention. The vectors, $v_1$ to $v_7$, each extended at an angle of φ, are also shown.

The LUT is populated along vectors drawn perpendicular to the gradient direction, as shown in FIG. 6. The vectors, $v_1$ to $v_7$, as shown, are each drawn at an angle φ so that each row position and each column position in the LUT will be populated by a gray level value.

An exemplary algorithm of the present invention may begin by positioning itself at the start of the first vector, $v_1$, and moving element-by-element along this vector. Any element in the LUT that the vector passes is then assigned a gray level value, as long as that element is still empty. When the edge of the LUT is reached (at the horizontal axis), the algorithm moves down to the next vector, namely, $v_2$. Values are then assigned along this vector, $v_2$. This process is repeated until every vector is traversed and the entire LUT is populated with gray level values.

The value assigned to each element of the LUT in an exemplary embodiment may be determined from a desired histogram of the LUT, denoted as H(z), where z is a gray level. H(z) is related to the desired probability distribution, p(z), where H(z)=$n^2$ p(z), where $n^2$ is the total number of elements in the LUT. The histogram, H(z), determines the maximum number of repetitions each gray level may have (for example, reference is now made to the histograms shown in FIGS. 14 and 15, in which z has a value between 0 and 15; and H(z) denotes the number of repetitions that the value z is allowed).

A counter in the algorithm starts at 0 and next assigns a value of z to each empty LUT element that is traversed along a specific vector. A counter is incremented each time an element is populated in the LUT. If the counter reaches H(z), that implies that the maximum number of repetitions of gray level z has been reached. At this point, the value of z is incremented and the counter is reset to zero. The process continues as the LUT is traversed along each successive vector.

In the example of FIG. 6, the input and output images have gray levels that can range from 0 to 3. As illustrated, the algorithm assigns a gray level value to each element in the LUT in a non-decreasing manner, along each succeeding vector, as the algorithm moves from top to bottom and from left to right along the LUT.

In the case of uniform fusion, H(z) is equal for all z, so each gray level fills an equal area in the LUT. Thus, each gray level in the LUT of FIG. 6 has 4 repetitions. For an arbitrary histogram of LUT gray levels, H(z), then H(i) represents the total area covered by a particular gray level i in the LUT.

Figure 7A:
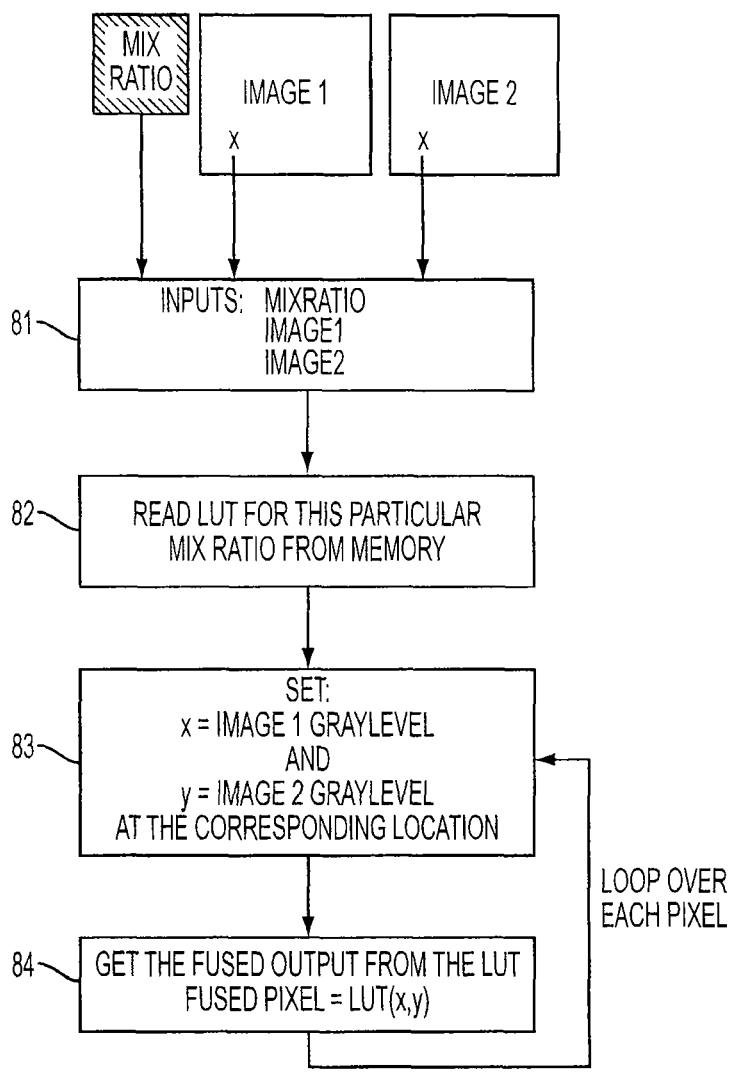
FIGS. 7A and 7B are flow diagrams depicting a method for forming a fused output image from an LUT populated by a fixed distribution of gray levels, based on two input images, and a mix-ratio, in accordance with an embodiment of the present invention.
Figure 7B:
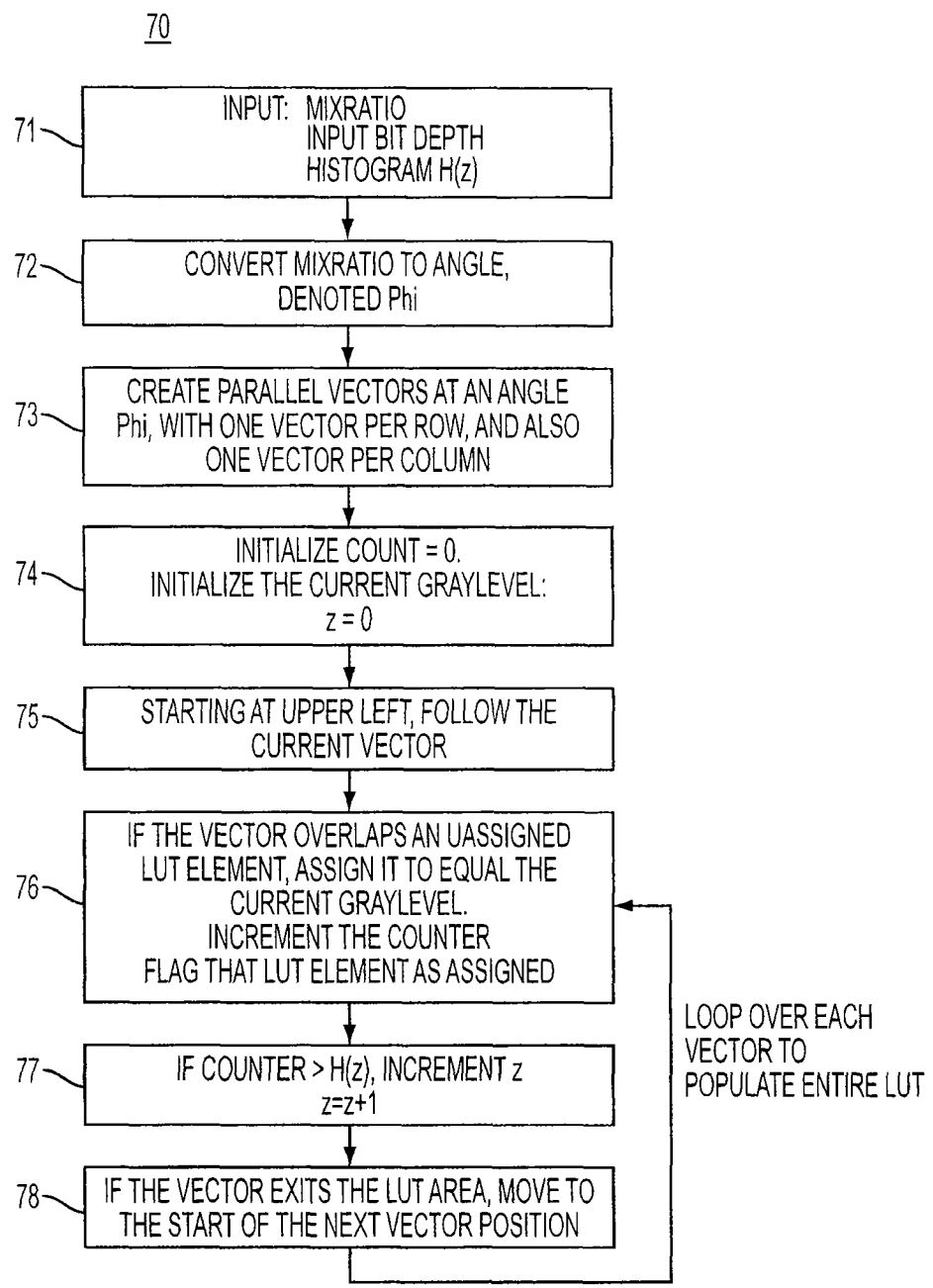

A flow diagram of a method of the present invention for populating an LUT in order to form an output image is shown in FIGS. 7A and 7B. The method, generally designated as 70, starts at step 81 by inputting a desired mix-ratio, a gray level value of a pixel of image 1, and a corresponding gray level value of a pixel of image 2. A LUT with the particular mix-ratio is read next by step 82. Step 83 finds the image 1 gray level value at position x of the horizontal axis and finds the image 2 gray level value at position y of the vertical axis. Step 84 obtains the gray level value, z, of the fused corresponding pixel of the output image at the intersection of position x and position y. This provides the fused pixel value z at LUT(x, y). Method 70 next branches back to step 83 to obtain the gray level value of the next pixel of the output image. The method continues looping back to process steps 83 and 84 in order to extract the gray level value, z, of each output pixel at the element of LUT(x, y).

Referring next to FIG. 7B, the manner in which method 70 forms the LUT will now be explained. Starting at step 71, which receives the input parameters of a desired mix-ratio, the bit-depth for images 1 and 2 and a desired histogram H(z). Step 72 converts the mix-ratio to determine the angle φ using Equation 1. The parallel vectors, v, are formed by step 73, so that each row and each column of the LUT includes a vector passing through it, as shown in FIG. 6.

Method 70 next initializes a counter to 0 and also initializes the current gray level value of z to 0 using step 74. Starting at the upper left of the LUT, step 75 follows the vector v. If the vector overlaps an unassigned LUT element, then step 76 assigns the element equal to the current gray level value of z. The counter is then incremented by one count and the assigned element is flagged as being filled. Step 77 determines whether the counter has reached the maximum number of repetitions for a specific gray level value of z. If the answer is yes, the gray level value of z is incremented to the next gray level value of z+1.

Step 78 determines whether the vector has exited the LUT area. If the answer is yes, then the method moves to the start of the next vector position along the vertical axis. By looping back to step 76, the method continues this process, until each vector is traversed and each element in the LUT is populated.

The above described method provides an algorithm for populating an LUT based on two input images, in order to form an output image having a desired probability distribution characteristic. Forming such a LUT, using the method provided in FIGS. 7A and 7B, however, is inefficient. In addition, method 70 is memory intensive, because the LUT is large. For example, the LUT may include 12-bit imagery in which $n=2^{12}-1$, and many LUTs are needed to approximate continuous mix-ratios between 0 and 1.

Consequently, the present invention provides another approach that uses algebraic formulation to increase the efficiency of the algorithm. This is accomplished by providing an algebraic formulation that calculates a fused gray level of an image based only on the input gray levels and a desired mix-ratio.

Figure 8:
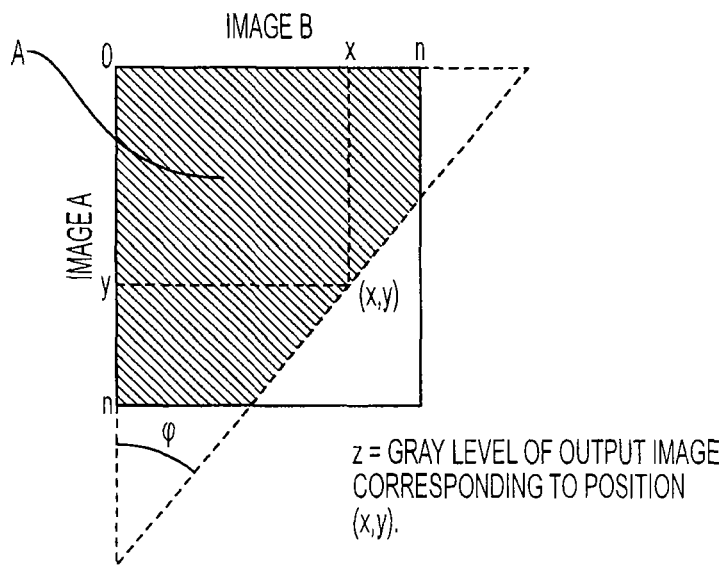
FIG. 8 is a virtual visualization of an LUT populated by forming a gradient in a given direction using a specified histogram of gray levels, where n is the same maximum gray level value of input image B and input image A, in accordance with an embodiment of the present invention.

The algebraic formulation forms a fixed distribution of elements in a virtual LUT. By using (1) a gray level value from input image B, denoted by x, and (2) a gray level value from input image A, denoted by y, and (3) the angle, $\phi$, the gray level value z of the output image at the LUT element position (x, y) may be calculated using the geometry shown in FIG. 8.

It will be understood that input image B, with gray levels varying from 0 to q, and input image A, with gray levels varying from 0 to r, may have different bit depths. Furthermore, the output image may also have a different bit depth, with gray levels varying from 0 to s. In an embodiment described herein, the two input images have the same bit depth. In other words q is equal to r. This is not a limitation of the invention, however, because if the input images have different bit depths, one or both of the input image bit depths may be rescaled in some manner, so that their range of possible values are the same, and the maximum possible gray level value of both inputs is then equal to n. Thus, for example, the maximum possible gray level of input image B is n; the maximum possible gray level of input image A is n; and the maximum possible gray level of the output image is s.

Figure 9A:
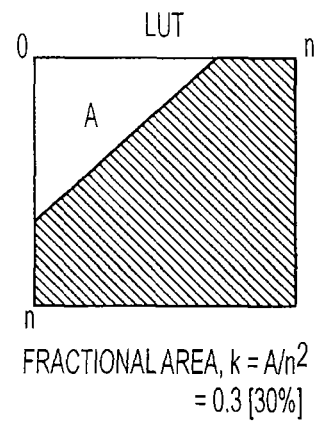
FIGS. 9A and 9B are illustrations showing how a fractional area covered by the area of interest, A, is used to evaluate the gray levels in the virtual LUT of FIG. 8, in which k varies between 0 and 1, and s is the maximum gray level in the virtual LUT. A desired probability distribution of gray levels, z, in the virtual LUT is p(z), and P(z) is the cumulative distribution function of p(z).
Figure 9B:
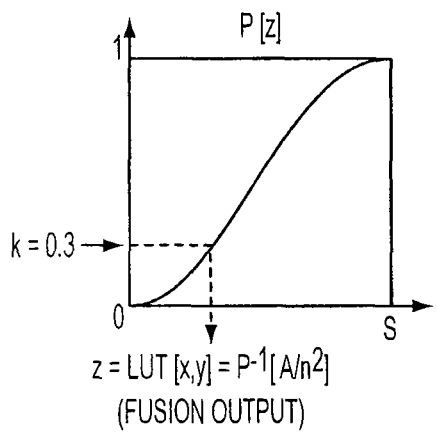

Thus, the LUT gray level values increase as a function of the area behind a diagonal line through (x, y) at an angle, $\phi$. This area of interest, A, is shown in hatched lines in FIG. 8. To better describe this mathematically, let p(z) be the desired probability distribution of gray levels in the LUT, and P(z) be the CDF (cumulative distribution function) of p(z), where z is a gray level. Then, the fusion output is the inverse of P(z), denoted as $P^{-1}(k)$, evaluated at the fraction of the total LUT area covered by A. This is illustrated in FIGS. 9A and 9B.

To describe this mathematically, the fused output is as follows:

$$z = LUT(x, y) = P^{-1}\frac{A}{n^2} \quad (2)$$

For the special case of uniform fusion, Equation 2 may be simplified. First, for uniform probability distribution, $p(z)=1/s$ ($0 \le z \le s$). The CDF of this function is easily invertible and provides a simple algebraic equation for $P^{-1}(k)$. In addition, if the bit depths of the input and output images are all equal, so s is equal to n, then the equation for uniform fusion may be simplified even further as follows:

$$z = LUT(x, y) = \left(\frac{As}{n^2}\right) = \frac{A}{n} \quad (3)$$

It will be understood that there are many ways of calculating the area of interest. One example of computing the area of interest is described below.

The area of interest, A, may be calculated using the above information and relatively simple geometry. It will be appreciated, however, that the shape of the area of interest changes as x, y, and/or $\phi$ change. The bounds on $\phi$ restrict the area, A to four possible scenarios, as illustrated in FIGS. 10A, 10B, 10C and 10D.

The area of interest, A, is included within each large triangle formed by the dotted lines in FIGS. 10A-10D. The area of each large triangle is designated as $A_1$. In FIG. 10A, area $A_1$ is equivalent to A. In FIGS. 10B-10D, however, it is necessary to subtract the area of either one or both of the small outer triangles from $A_1$ to determine A. The areas of the lower triangles in FIGS. 10C and 10D are designated as $A_2$, and the areas of the upper triangles in FIGS. 10B and 10D are designated as $A_3$.

Figure 11:
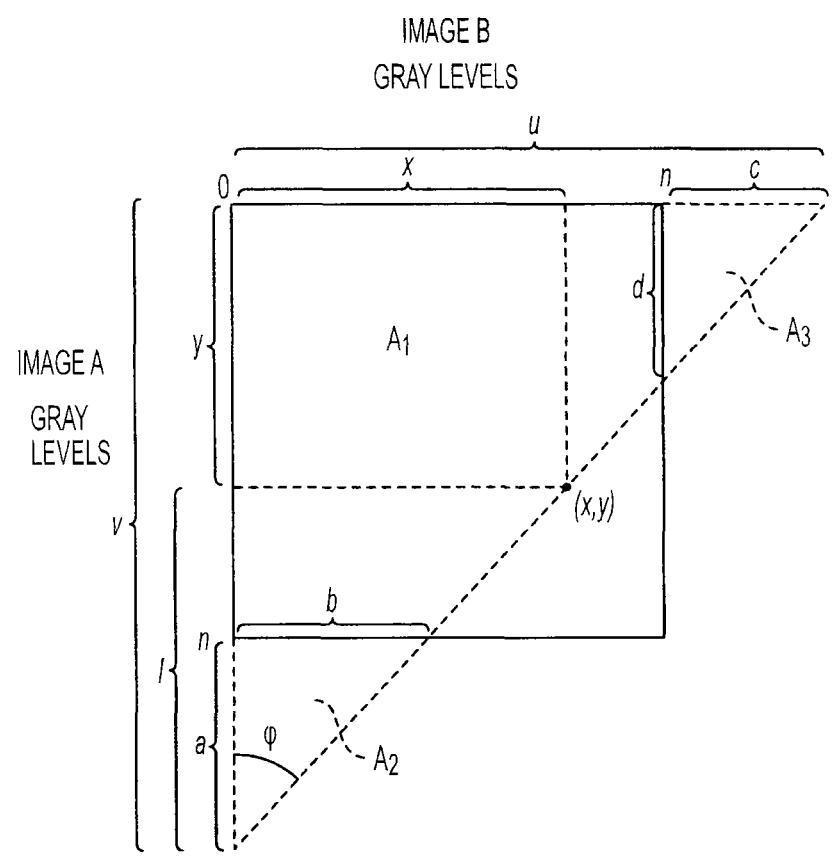
FIG. 11 illustrates an example of how the fractional area covered by the area of interest, A (shown in FIG. 9A) is calculated by a processor of the present invention.

Given element (x, y) as coordinates of a gray level value for a certain pixel in the output image and a desired mix-ratio, then the conventions shown in FIG. 11 may be used to determine how to calculate the area of interest, A. Curly braces in the figure denote distances. It is important to note that the small triangles may not exist; therefore, the lengths of segments a and c are used by the present invention to test if the small triangles do exist.

First, Equation 1 is used to compute $\phi$. Then Equations 4 through 7 are used to calculate the area of the large triangle, $A_1$, as follows:

$$l = \frac{X}{\tan(\varphi)} \quad (4)$$

$$v = y + l \quad (5)$$

$$u = v \tan(\phi) \quad (6)$$

$$A_1 = 0.5\, uv \quad (7)$$

Next, the method of the present invention determines if the lower triangle exists. If it exists, then area, $A_2$, is computed. If the triangle exists, the method subtracts n from v to determine the length of side a. If the subtraction results in a negative number, however, then the lower triangle is assumed not to exist. If this is the case, then the value of a is set to 0, which forces the area, $A_2$, to be set to 0. This test is implemented by the present invention using the max function, as shown in Equation 8 below:

$$a = \max(v - n, 0) \quad (8)$$

Next, straightforward geometry is used to compute area $A_2$, as follows:

$$b = a \tan(\phi) \quad (9)$$

$$A_2 = 0.5ab \quad (10)$$

Similarly, the method of the present invention determines if the upper triangle exists. If the triangle exists, the method computes upper area, $A_3$, as follows:

$$c = \max(u - n, 0) \quad (11)$$

$$d = \frac{c}{\tan(\varphi)} \quad (12)$$

$$A_3 = 0.5cd \quad (13)$$

Finally, the method solves for the area of interest, A, which is used in Equation 3 to determine the fused output, as follows:

$$A = A_1 - (A_2 + A_3) \quad (14)$$

The above described method, in case of uniform fusion, produces results algebraically, without any need for cumbersome LUTs.

Figure 12A:
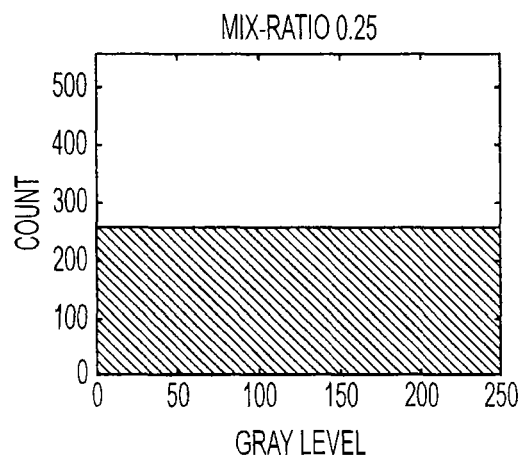
FIGS. 12A, 12B and 12C show examples of histograms resulting from an algebraic uniform fusion method of the present invention the examples showing, respectively, mix-levels of 0.25, 0.50 and 0.75.
Figure 12B:
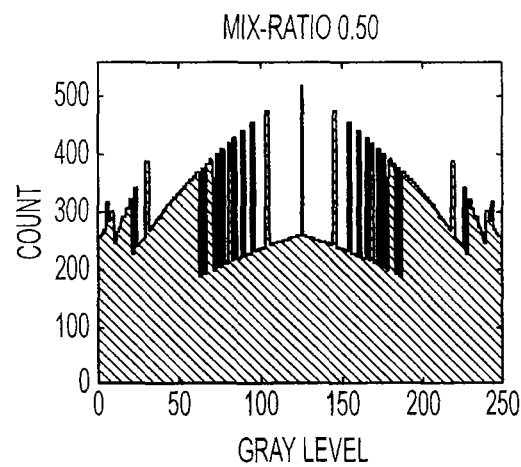
Figure 12C:
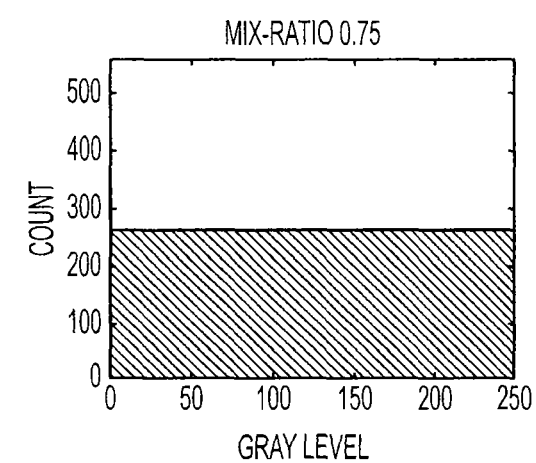

Histograms of LUTs formed with the algebraic uniform fusion algorithm of the present invention are only approximately uniform due to the discrete gray levels of the example provided. A most extreme deviation from a uniform distribution may occur when a mix ratio=0.5 is desired, because the area approximations fall along a diagonal line. The actual distribution may be seen in the histograms plotted in FIGS. 12A, 12B and 12C. The histogram in FIG. 12A depicts a uniform distribution with a mix ratio of 0.25. The histogram in FIG. 12C depicts a uniform distribution with a mix ratio of 0.75. The histogram in FIG. 12B depicts a uniform distribution with a mix ratio of 0.50.

Figure 13:
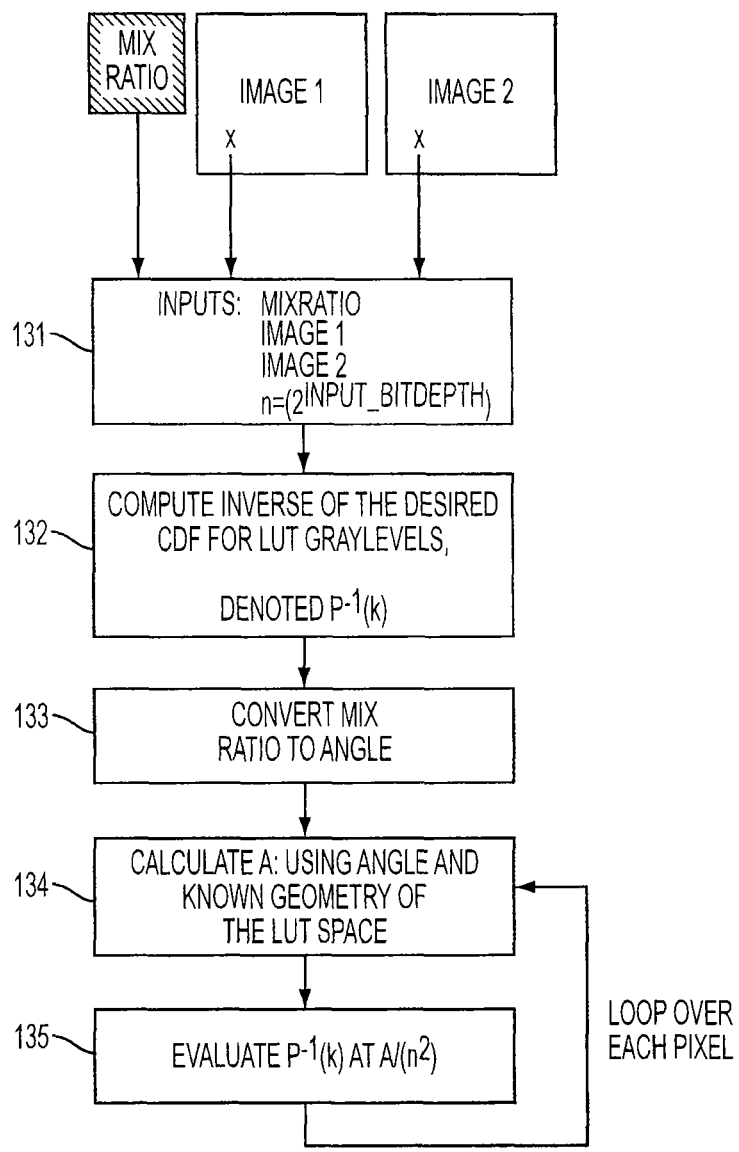
FIG. 13 is a flow diagram depicting an algebraic method for forming a fused output image having a fixed distribution of gray levels, based on two input images and a mix-ratio, in accordance with an embodiment of the present invention.
Figure 16A:
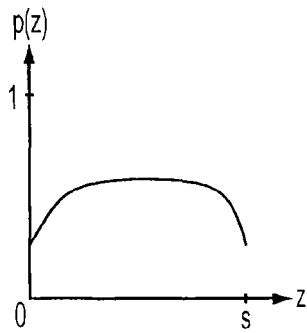
FIGS. 16A, 16B and 16C are, respectively, exemplary curves of p(z), P(z) and $P^{-1}(k)$, where z is a gray level value that varies from 0 to a maximum gray level value of s, and k is a probability that varies from 0 to 1. Furthermore, p(z) is a probability distribution function; and P(z) is a cumulative distribution function (CDF) of p(z). The gray level value, z, of the pixel is a function of the inverse of P(z), where the inverse is denoted as $P^{-1}(k)$, and k varies between 0 and 1.
Figure 16B:
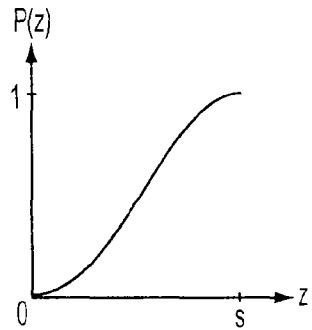
Figure 16C:
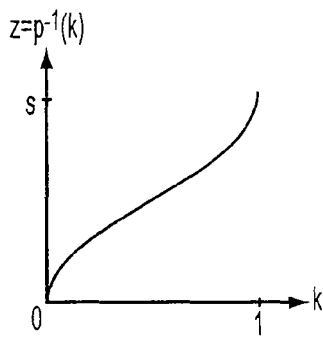

A flow diagram for the algebraic formulation method of the present invention is shown in FIG. 13. The method assumes that the input images and the output image are not necessarily equal in size. This, however, is not a limitation of the present invention, as the input images and the output image may be equal in size. Furthermore, when a pixel from a first input image A does not have a corresponding pixel value from a second input image to fuse together, then the output image may use the pixel value of the larger first input image A.

Referring to FIG. 13, an algebraic formulation method is presented in a flow diagram, the method designated generally by 130. Step 131 receives the required input values, namely the mix-ratio, the pixels of image 1, the pixels of image 2, and the maximum pixel value of image 1 and image 2, namely n. Step 132 computes the inverse of the desired CDF for the gray level values (for example, the CDF may be the same as that shown in FIG. 9B, which in the figure is for a particular cumulative distribution function, P(z)). Step 133 uses Equation 1 to determine the angle of $\phi$.

The area of interest A is calculated, in step 134, by using the angle of $\phi$ and the known geometry of the LUT space, as shown in FIGS. 10A through 10D. The inverse of the desired CDF, namely $P^{-1}(k)$, is evaluated, by step 135, at the fractional area of $A/n^2$. This result provides the gray level value z at element (x, y) of the virtual LUT. The method 130 loops back to step 134 and continues the process until each pixel for the output image is determined.

It will be appreciated that the output from the fusion has good image quality. The output image quality may be further improved by adjusting the CDF of P(z) in Equation 2. Depending on the CDF, however, additional complexity may be added to the method which may require a LUT to evaluate $P^{-1}(k)$.

For a mix ratio of exactly 0.5, the LUT in FIG. 12B is the worst approximation to a uniform distribution that the algebraic approach produces. This is because the area of interest runs directly along a diagonal and every element along this diagonal is identically rounded. Even with this much variation from a uniformly distributed LUT, the method described produces very good imagery, and the gray levels are at most at a difference of 1 from what they would be if the histogram were exactly uniform.

Provided as examples of algebraic uniform fusion for 4-bit input and output imagery (gray levels range from 0 to 15), reference is now made to FIGS. 14 and 15. Also included in each figure is a histogram of each LUT. Notice that the histograms are approximately uniform. It will be appreciated that expanding the algebraic uniform fusion to higher bit-depths tends to have similar histogram shapes. Thus, for the sake of simplicity only 4-bit LUTs are shown.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A look-up-table (LUT) for forming an output image from a combination of two input images, the LUT comprising:

first and second sets of gray levels, respectively, formed from first and second input images, and a third set of gray levels, calculated by a processor, for forming an output image, wherein the third set of gray levels is formed from the first and second sets of gray levels, and a pixel of the output image includes a gray level value of z that is dependent on a probability distribution function of gray levels in the LUT, expressed as p(z), where z is a gray level; and the LUT includes:

a virtual two dimensional table having horizontal and vertical axes, x and y, wherein n is a maximum gray level value of the first set of gray levels, virtually placed along the vertical axis, n is a maximum gray level value of the second set of gray levels, virtually placed along the horizontal axis, A is an area in the LUT included within the horizontal and vertical axes and a diagonal line extending between the horizontal and vertical axes, through a point (x, y), then the gray level value, z, of the pixel is located on the diagonal line and is $P^{-1}(k=A/(n^2))$, where k varies between 0 and 1.

2. The LUT of claim 1 wherein

P(z) is a cumulative distribution function (CDF) of p(z), and the gray level value, z, of the pixel is a function of the inverse of P(z).

3. The LUT of claim 1 wherein the virtual two dimensional table is virtually populated based on computations performed by the processor during execution of a program.

4. The LUT of claim 1 wherein p(z) includes a uniform probability distribution of 1/s, where s is a maximum gray level value of the pixels in the output image, and the gray level value, z, of the output pixel is $z=(As)/(n^2)$.

5. The LUT of claim 1 wherein the values of n and s are maximum pixel values, respectively, of the first and second sets of gray levels and an output set of gray level values of the output image.

6. The LUT of claim 1 wherein the diagonal line is extended between the vertical axis and the horizontal axis at an angle of $\phi$ with respect to the vertical axis, through the point (x, y) in the virtual lookup table, where y is the pixel value from the first image, and x is the pixel value from the second image, a gradient from dark gray levels to light gray levels is formed along the angle $\phi$ with respect to the vertical axis, and the angle φ is determined by a mix-ratio of α, as follows:

$$\varphi = \frac{\pi}{2(1-\alpha)}.$$

7. The LUT of claim 6 wherein
the mix-ratio is configured to be determined either automatically by the processor or manually by a user.
8. The LUT of claim 6 wherein
the output image is identical to the first input image, when φ is equal to π/2, and
the output image is identical to the second input image, when φ is equal to 0.
9. A system for fusing input images to form an output image comprising:
a first imager for forming a first image,
a second imager for forming a second image,
a processing module for fusing the first and second images, wherein the processing module includes
a calculator for determining a gray level value of z assigned to a pixel of the output image, based on a probability distribution function expressed as p(z),
n is a maximum gray level value in a first set of gray levels of the first imager, represented along a vertical axis,
n is a maximum gray level value in a second set of gray levels of the second image, represented along a horizontal axis,
A is an area in the LUT, included within the horizontal and vertical axes, x and y, and a diagonal line extending through a point (x, y),
then the gray level value, z, of the pixel is located on the diagonal line and is $P^{-1}(k=A/(n^2))$, where k varies between 0 and 1.
10. The system of claim 9 wherein
P(z) is a cumulative distribution function (CDF) of p(z), and the gray level value, z, of the pixel is a function of the inverse of P(z).
11. The system of claim 9 wherein
s a maximum gray level value of the output image,
p(z) includes a uniform probability distribution of 1/s, and the gray level value, z, of the output pixel is $z=(As)/(n^2)$.
12. The system of claim 9 wherein
the diagonal line is extended between the vertical axis and the horizontal axis at an angle of φ with respect to the vertical axis, through the point (x, y) in the virtual LUT, where y is the pixel value from the first image, and x is the pixel value from the second image,
a gradient from dark gray levels to light gray levels is formed along the angle φ, with respect to the vertical axis, and the angle φ is determined by a mix-ratio of α, as follows:

$$\varphi = \frac{\pi}{2(1-\alpha)}.$$

13. A method of forming an output image based on first and second input images, the method comprising the steps of:
determining a mix-ratio, α, between the first and second input images;
determining an angle φ based on the mix-ratio of α, as follows:

$$\varphi = \frac{\pi}{2(1-\alpha)}$$

extending a diagonal line at the angle of φ between a vertical axis and a horizontal axis in the LUT, in which the vertical axis, x, includes a gray level value from the first input image and the horizontal axis, y, includes a gray level value from the second input image, and the diagonal line passes through a position (x, y) at the angle φ with respect to the vertical axis;
computing an area A included within the horizontal and vertical axes and the diagonal line,
determining the gray level value at position (x, y) for the pixel of the output image, defined as z, using the following equation:
$z=P^{-1}(k=A/(n^2))$
where k varies between 0 and 1,
n represents the maximum gray level of the first input image, and
n represents the maximum gray level of the second input image.
14. The method of claim 13 wherein
p(z) includes a uniform probability distribution of 1/s, where s is a maximum gray level value of the pixels in the output image, and
the gray level value, z, of the pixel of the output image is $z=(As)/(n^2)$.
15. The method of claim 13 wherein
P(z) is a cumulative distribution function (CDF) of p(z), and
the gray level value, z, of the pixel of the output image is a function of the inverse of P(z).
16. The method of claim 13 including the step of:
forming a gradient from dark gray levels to light gray levels along the angle φ with respect to the vertical axis.

* * * * *